United States Patent
Oh et al.

(10) Patent No.: US 8,041,970 B2
(45) Date of Patent: Oct. 18, 2011

(54) CLUSTER SYSTEM WITH REDUCED POWER CONSUMPTION AND POWER MANAGEMENT METHOD THEREOF

(75) Inventors: Soo-Cheol Oh, DaeJeon (KR); Seong-Woon Kim, DaeJeon (KR); Myung-Joon Kim, DaeJeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 406 days.

(21) Appl. No.: 12/245,055

(22) Filed: Oct. 3, 2008

(65) Prior Publication Data
US 2009/0158074 A1    Jun. 18, 2009

(30) Foreign Application Priority Data

Dec. 12, 2007 (KR) .......................... 10-2007-0129211

(51) Int. Cl.
*G06F 1/26* (2006.01)
(52) U.S. Cl. ........................................ 713/320; 713/324
(58) Field of Classification Search .................. 713/310, 713/320, 321, 322, 323, 324
See application file for complete search history.

(56) References Cited

U.S. PATENT DOCUMENTS

| | | | | |
|---|---|---|---|---|
| 5,396,635 A * | 3/1995 | Fung | ............................ | 713/323 |
| 6,079,025 A * | 6/2000 | Fung | ............................ | 713/323 |
| 7,051,215 B2 | 5/2006 | Zimmer et al. | | |
| 7,484,111 B2 * | 1/2009 | Fung | ............................ | 713/320 |
| 7,552,350 B2 * | 6/2009 | Fung | ............................ | 713/320 |
| 7,562,239 B2 * | 7/2009 | Fung | ............................ | 713/320 |
| 7,721,125 B2 * | 5/2010 | Fung | ............................ | 713/320 |
| 2007/0050650 A1 * | 3/2007 | Conroy et al. | ................ | 713/300 |
| 2008/0209240 A1 * | 8/2008 | He et al. | ....................... | 713/300 |
| 2009/0106571 A1 * | 4/2009 | Low et al. | ..................... | 713/310 |
| 2009/0109230 A1 * | 4/2009 | Miller et al. | ................... | 345/506 |
| 2009/0210654 A1 * | 8/2009 | Koul et al. | ...................... | 712/25 |
| 2009/0265572 A1 * | 10/2009 | Heinle et al. | .................. | 713/500 |

FOREIGN PATENT DOCUMENTS

| | | |
|---|---|---|
| JP | 06-309288 | 11/1994 |
| JP | 9-91254 | 4/1997 |
| JP | 10-187636 | 7/1998 |
| JP | 2005-100387 | 4/2005 |
| KR | 10-2006-0127120 | 12/2006 |

OTHER PUBLICATIONS

Korean Office Action issued Sep. 30, 2009 in corresponding Korean Patent Application 10-2007-0129211.
Korean Office Action issued Jun. 21, 2010 in corresponding Korean Application No. 10-2007-01219211.

* cited by examiner

*Primary Examiner* — Khanh Dang
(74) *Attorney, Agent, or Firm* — Staas & Halsey LLP

(57) ABSTRACT

Provided are a cluster system, which can reduce power consumption by controlling power at a cluster level according to loads, and a power management method of the cluster system. The cluster system includes a plurality of management target nodes for performing an actual task which the cluster system is supposed to perform, a load balancer/switch for distributing a user's request received through an external network into the management target nodes, and a power management master for monitoring a load of an entire system and performing a power management by controlling the load balancer/switch. The power management master classifies the management target nodes into a power on group and a power off group.

3 Claims, 4 Drawing Sheets

CLUSTER SYSTEM WITH REDUCED POWER CONSUMPTION AND POWER MANAGEMENT METHOD THEREOF

This work was supported by the IT R&D program of MIC/IITA [Work Management Number: 2007-S-016-01, A Development of Cost Effective and Large Scale Global Internet Service Solution].

CROSS-REFERENCE TO RELATED APPLICATIONS

This application claims priority under 35 U.S.C. §119 to Korean Patent Application No. P2007-129211, filed in Korea on Dec. 12, 2007, the disclosure of which is incorporated herein by reference in its entirety.

BACKGROUND OF THE INVENTION

1. Field of the Invention

The present disclosure relates to a cluster system and a power management method thereof, and more particularly, to a cluster system, which can reduce power consumption by controlling power under a cluster level according to the load of the cluster system, and a power management method of the cluster system.

2. Description of the Related Art

Various attempts have been made to reduce the power consumption of a computer system that consumes a large amount of power. A basic principle of reducing the power consumption of a computer system is to switch currently unused components into a low power mode. On the other hand, the basic principle is to switch the components into a normal operation mode when they start to operate, to thereby carry out an original task. It is an advanced configuration and power interface (ACPI) to have standardized such a power management scheme.

The ACPI is a power management specification that is co-developed by Intel, Microsoft, and Toshiba Inc, and can turn off power supplied to the currently unused components by allowing it to control a power connected to the components of a computer. For this end, the ACPI defines various power states with respect to each computer component, and provides an interface capable of changing the power state of each component according to the state of a computer. An operating system (OS) or an application program uses the ACPI to control the power consumed in each component. In this case, an algorithm for determining when to switch each component into the low power mode or the normal operation mode is independently determined by the OS or the application program.

A dynamic voltage scaling (DVS) is a technology that reduces the power consumption of the CPU, which is the most power consuming component in the components of a computer. More specifically, the DVS can reduce the power consumption of the CPU by controlling the operation frequency and the voltage of the CPU. Since the CPU operates in synchronization with a clock, the CPU has characteristics that its power consumption is reduced in slowing down its operation frequency. Further, power consumption is in proportion to the square of a voltage, thus the consumption of power is reduced in lowering the voltage.

Various technologies for the power consumption reduction have been introduced, but they manage power of local hardware resources at an individual node level. Accordingly, power is not effectively managed in view of an entire cluster system. However, the cluster system in which nodes are connected to one another requires a cluster level power management.

Since all nodes in a typical cluster system are always operated in the maximum performance mode, the typical cluster system has a disadvantage in that power is consumed even when the cluster system does not operate.

SUMMARY

Therefore, an object of the present invention is to provide a cluster system, which can reduce power consumption by controlling power under a cluster level according to the load of the cluster system, and a power management method of the cluster system.

To achieve these and other advantages and in accordance with the purpose(s) of the present invention as embodied and broadly described herein, a cluster system in accordance with an aspect of the present invention includes: a plurality of management target nodes for performing an actual task which the cluster system is supposed to perform; a load balancer/switch for distributing a user's request received through an external network into the management target nodes; and a power management master for monitoring a load of an entire system and performing a power management by controlling the load balancer/switch, wherein the power management master classifies the management target nodes into a power on group and a power off group.

To achieve these and other advantages and in accordance with the purpose(s) of the present invention, a power management method of a cluster system in accordance with another aspect of the present invention includes: checking a current load of the system which is periodically collected and recording the load of the system for each time period; classifying management target nodes into a power on group and a power off group according to a profile which is recorded with the current load of the system and the load of the cluster system; powering on all the management target nodes assigned to the power on group; notifying a load balancer/switch of information on the management target nodes belonging to the power on group and the power off group to distribute a task only to the power on group; and powering off all the management target nodes assigned to the power off group.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS

Hereinafter, specific embodiments will be described in detail with reference to the accompanying drawings.

Figure 1:
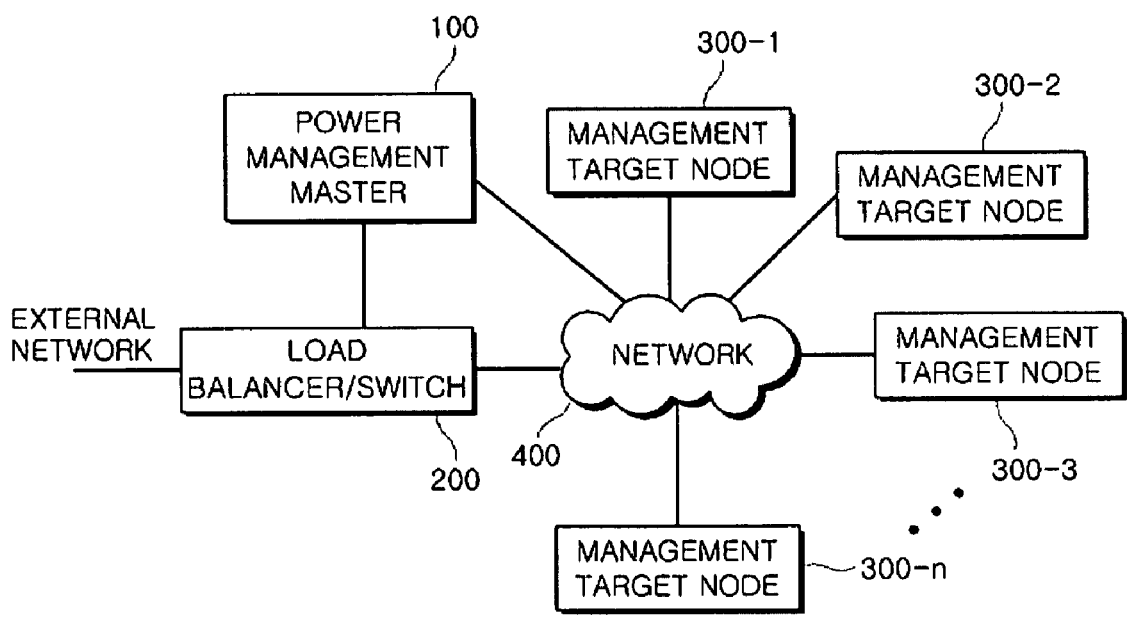
FIG. 1 is a block diagram of a cluster system with reduced power consumption according to an embodiment of the present invention.

FIG. 1 is a block diagram of a cluster system with reduced power consumption according to an embodiment of the present invention.

Referring to FIG. 1, the cluster system according to the embodiment of the present invention includes a power management master 100, a load balancer/switch 200, and a plurality of management target nodes 300-1 to 300-$n$ (where n is a positive integer more than 1). In this case, the cluster system is connected to an external network via the load balancer/switch 200 to provide a service. The power management master 100 and the load balancer/switch are connected to the management target nodes 300-1 to 300-$n$ via a network 400.

The power management master 100 monitors a load of an entire system and performs a power management by controlling the load balancer/switch 200 and the management target nodes 300-1 to 300-$n$.

The load balancer/switch 200 distributes a user's request input from an external network to each management target node.

The management target nodes 300-1 to 300-$n$ perform real tasks that the cluster system is supposed to perform.

Figure 2:
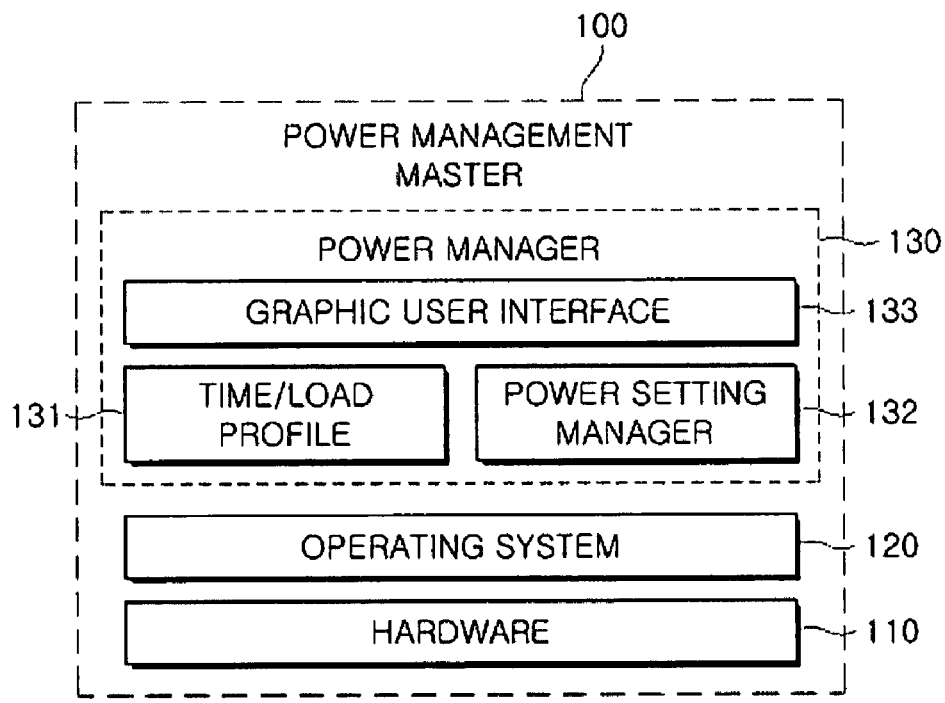
FIG. 2 is a block diagram of a power management master illustrated in FIG. 1.

FIG. 2 is a block diagram of the power management master illustrated in FIG. 1.

Referring to FIG. 2, the power management master 100 is embodied in such a form that a power manager 130 is mounted onto a hardware 110 and an OS 120.

The power manager 130 includes a time/load profile 131, a power setting manager 132, and a graphic user interface 133.

Figure 3:
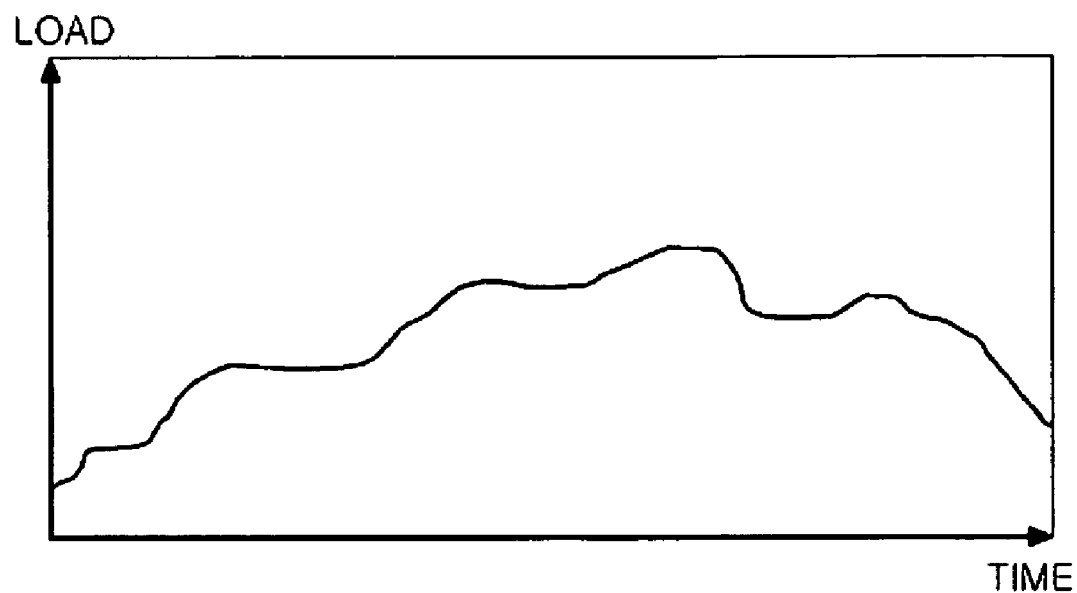
FIG. 3 is a graph of a load versus time profile showing variation of the load imposed on the cluster system according to the embodiment of the present invention.

The time/load profile 131 is a profile to which the load of the cluster system is recorded for time as illustrated in FIG. 3, and may show that the load imposed on the cluster system varies with time. The time/load profile 131 is a value which may be obtained from an actual operation environment of the cluster system during a past certain period. The time/load profile 131 is periodically reflected with the latest information on the system during its operation. A time interval of a horizontal axis in FIG. 3 may be, e.g., a day or a week, but may vary with a policy of an administrator in an actual implementation.

The power setting manager 132 controls the power of the management target nodes 300-1 to 300-$n$ by reflecting the current load of the system and the time/load profile 131.

The graphic user interface 133 generates and modifies the time/load profile 131. The graphic user interface 133 displays a current power state of the management target nodes 300-1 to 300-$n$ to a manager and it includes a user interface necessary for the power management.

Figure 4:
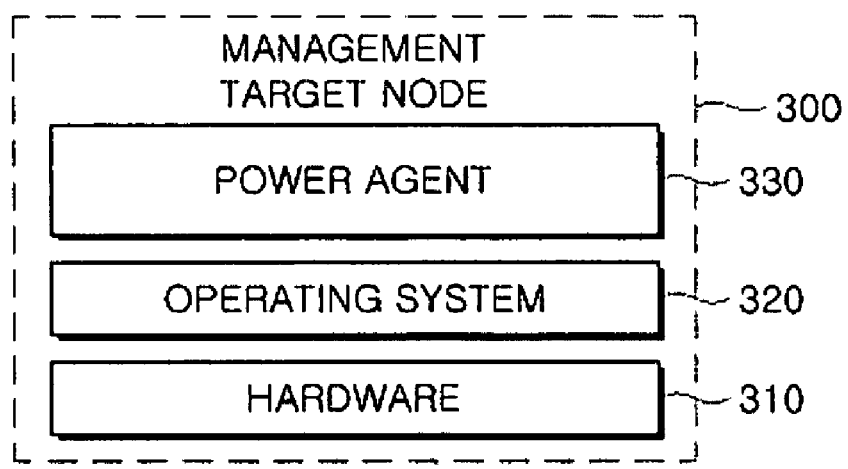
FIG. 4 is a block diagram of a management target node illustrated in FIG. 1.

FIG. 4 is a block diagram of the management target node illustrated in FIG. 1.

Referring to FIG. 4, the management target nodes 300-1 to 300-$n$ are embodied in such a form that a power agent 330 is mounted onto a hardware 310 and an OS 320.

The power agent 330 changes a power state of the node in accordance with a power management command transmitted from the power management master 100.

A power control mechanism of the power setting manager 132 of the power management master 100 will be described below.

The power control mechanism of the power setting manager 132 supports a function of powering on or off the management target nodes 300-1 to 300-$n$ in accordance with the time/load profile and the current load of the cluster system.

Since the cluster system is installed to meet the maximum load, system resources may be wasted for the greater part of time when the cluster system is not in the maximum load. Accordingly, when the cluster system is not in the maximum load, the cluster system powers on only a part of the cluster system to operate them and powers off the other part thereof, thereby reducing the power consumption.

Figure 5:
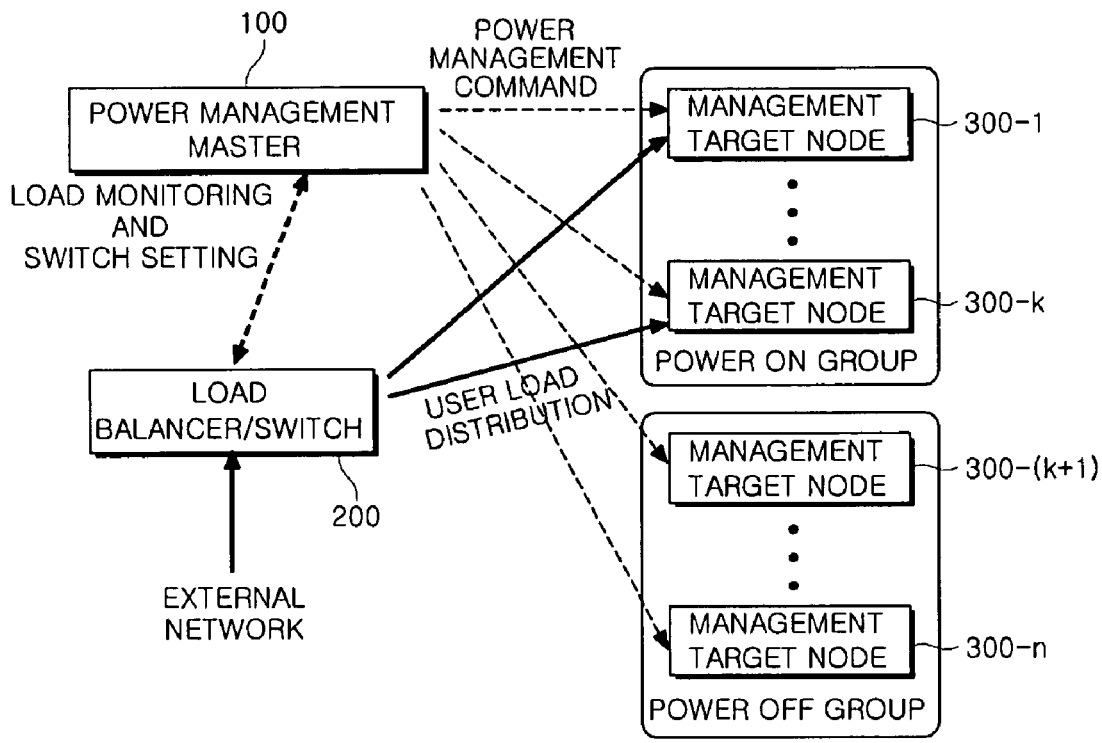
FIG. 5 is a block diagram illustrating a process for managing a power of a management target node in the cluster system according to an embodiment of the present invention.

FIG. 5 is a block diagram illustrating a process for managing power of the management target node in the cluster system according to an embodiment of the present invention.

Referring to FIG. 5 the management target nodes 300-1 to 300-$n$ include a power on group and a power off group.

The management target nodes 300-1 to 300-$k$ (where k is a positive integer more than 1) of the power on group are a group of nodes which are supplied power to perform the actual tasks.

The management target nodes 300-($k$+1) to 300-$n$ of the power off group are powered off not to thereby perform the tasks, and consequently can reduce the power consumption.

The power management master 100 controls the management target nodes 300-1 to 300-$k$ of the power on group and the management target nodes 300-($k$+1) to 300-$n$ of the power off group in accordance with the current load of the system and the time/load profile 131. That is, when the load of the system increases, the number of the management target nodes 300-1 to 300-$k$ belonging to the power on group is increased so that a user's request may be fulfilled. When the load of the system decreases, the number of the management of the management target nodes 300-($k$+1) to 300-$n$ belonging to the power off group is increased so that the power consumption may be reduced. The power management master 100 obtains information on the current load from the load balancer/switch 200. The power on group and the power off group are determined in accordance with the current load information and the time/load profile 131. Then, the power management master 100 transmits the power management command to the management target nodes 300-1 to 300-$n$, and changes the set up of the load balancer/switch 200. Further, the load balancer/switch 200 distributes a user's request received via an external network into the management target nodes 300-1 to 300-$k$ of the power on group according to changed set up.

Figure 6:
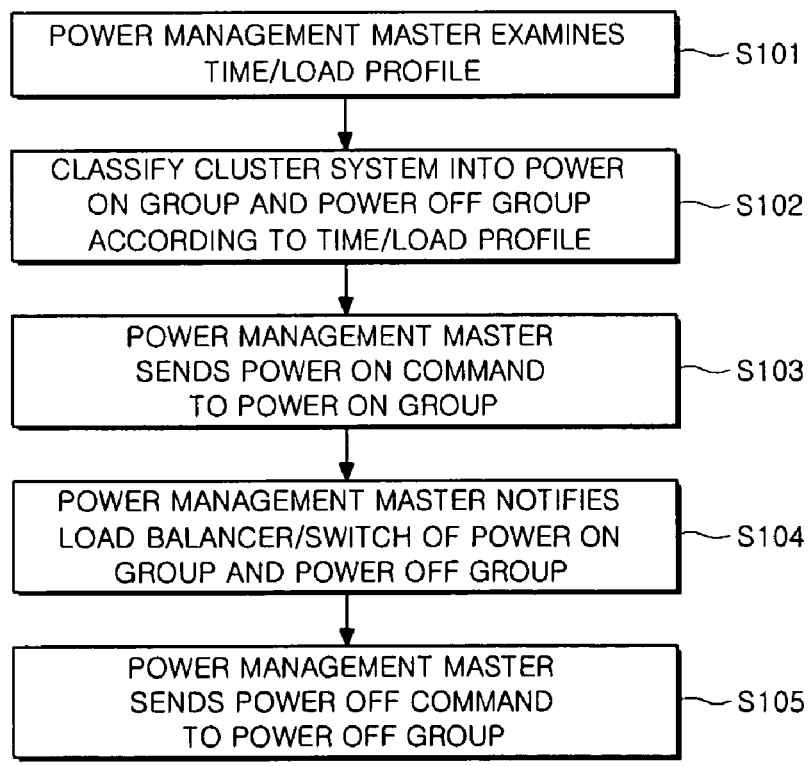
FIG. 6 is a flowchart illustrating a power management process of the power management master in the cluster system according to an embodiment of the present invention.

FIG. 6 is a flowchart illustrating a power management process of the power management master in the cluster system according to an embodiment of the present invention.

Referring to FIG. 6, the power management master 100 periodically investigates a current load of the system collected through the time/load profile 131 and the load balancer/switch 200, in step S101. In step S102, the power management master 100 classifies the management target nodes 300-1 to 300-$n$ into the power on group and the power off group by selecting the management target nodes 300-1 to 300-$k$ belonging to the power on group on the basis of the checked information. In the classifying operation, a method of selecting the power on group will be described in more detail with reference to FIG. 7.

In step S103, the power management master 100 powers on all the management target nodes assigned to the power on group. In this operation, the power management master 100 performs the tasks by sending a power on command to the management target nodes which are classified as the power on group but currently powered off. In this case, the power management master 100 will not send any command to the already powered-on management target nodes. The power management master 100 uses "wake on Lan" or IPMI function to send the power on command to the management target node.

In step S104, the power management master 100 notifies the load balancer/switch 200 of information on the management target nodes 300-1 to 300-*n* respectively belonging to the power on group and the power off group, thus allows the load balancer/switch 200 to only distribute tasks into the power on group.

In step S105, the power management master 100 powers off all the management target nodes assigned to the power off group. In this operation, the power management master 100 sends a power off command to the currently powered-on management target nodes classified as the power off group. In this case, the power management master 100 does not send any command to the already powered-off management target nodes. Accordingly, if the power agent 330 of the management target nodes receives the power off command, the management target nodes perform a task of powering off after the current task is normally finished.

Figure 7:
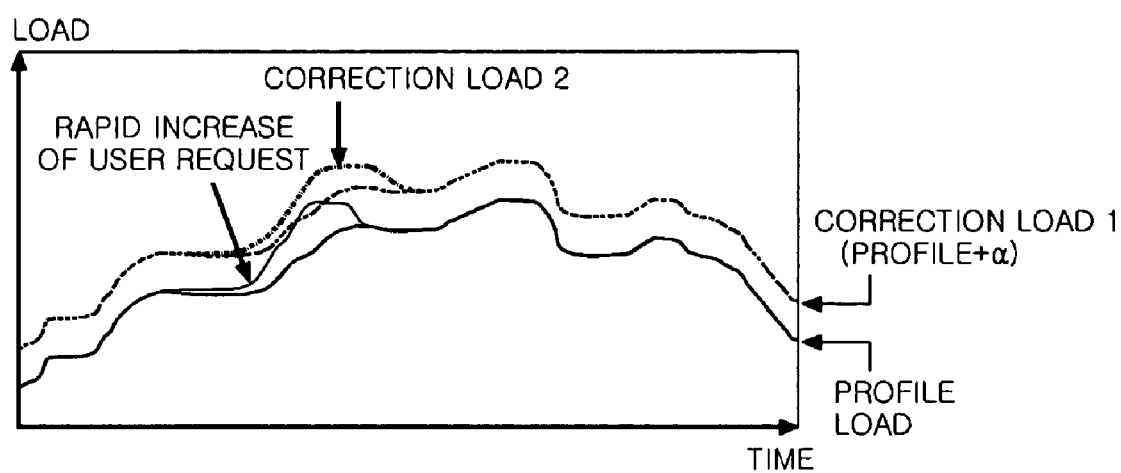
FIG. 7 is a graph of a load versus time profile in the cluster system according to the embodiment of the present invention, showing a method for determining a power on group and a power off group according to a current load of the cluster system.

FIG. 7 is a graph of a load versus time profile in the cluster system according to the embodiment of the present invention, showing a method for determining a power on group and a power off group according to a current load of the cluster system.

Referring to FIG. 7, the power management master 100 corrects a load recorded on the time/load profile 131. Although the time/load profile 131 is a past record, there is more possibility that the time/load profile 131 may mismatch with the current system load. That is, a problem capable of not performing a user service may occur in case that an actual load excesses the time/load profile 131 while the system is operated according to the time/load profile 131. To solve this problem, the power management master 100 adds α to the profile load value to thereby correct the time/load profile (131) load, thus treats an excessive load as expressed in Equation (1) below (correction load 1).

$$\text{Correction load 1} = \text{profile load} + \alpha \quad (1)$$

For example, a is set to approximately 10% or 20% of the profile load. A problem may occur when system load rapidly increases to excess the correction load 1 in spite of α. For this case, the power management master 100 calculates a correction load 2. When a difference value between the correction load 1 and the current load value is smaller than the threshold value as expressed in Equation (2) below, the power management master 100 determines that the current load rapidly increase so that it adds a difference value between the current load and the profile load to the correction load 1, thereby calculating a correction load 2 as expressed in Equation (3) below.

$$\text{Correction load 1} - \text{current load} < \text{threshold value} \quad (2)$$

$$\text{Correction load 2} = \text{correction load} + (\text{current load} - \text{profile load}) \quad (3)$$

When the correction load 2 is determined, the power management master 100 determines the power on group and the power off group on the basis of the correction load 2. The number of the management target nodes belonging to the power on group may be determined by dividing the correction load 2 by a load to which a single management target node provides service, as expressed in Equation (4) below, but the present invention is not limited to this. The power on group can be determined in various ways according to the implementation of the real system.

$$\text{Number of nodes belonging to power on group} = \text{correction load 2/single node service load} \quad (4)$$

That is, the number of the nodes belonging to the power on group is determined by dividing the correction load 2 by a load level which can be served by the single management target node.

With the above constitution of the present invention, management target nodes are classified into a power on group and a power off group, and managed at a cluster level in accordance with a load of a cluster system, thereby reducing the power consumption significantly.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A power management method of a cluster system, the method comprising:
    checking a current load of the system which is periodically collected and recording the load of the system for each time period;
    classifying management target nodes into a power on group and a power off group according to a profile which is recorded with the current load of the system and the load of the cluster system;
    powering on all the management target nodes assigned to the power on group;
    notifying a load balancer/switch of information on the management target nodes belonging to the power on group and the power off group to distribute a task only to the power on group; and
    powering off all the management target nodes assigned to the power off group,
    wherein the classifying of the management target nodes, includes correcting the load recorded in the profile,
    wherein a first correction load is calculated by adding a predetermined value (a) to the profile load when an actual load exceeds the profile,
    wherein a second correction load is calculated by adding a difference value between the current load and the profile load to the first correction load when a difference value between the first correction load and the current load is smaller than a threshold value by a rapid increase of the load of the system.

2. The method of claim 1, wherein the power on group and the power off group are determined on a basis of the second correction load.

3. The method of claim 2, wherein number of the management target nodes belonging to the power on group is determined by dividing the second correction load by a load served by a single node service.

\* \* \* \* \*